(12) United States Patent
Thomsen et al.

(10) Patent No.: US 7,776,285 B2
(45) Date of Patent: Aug. 17, 2010

(54) REACTOR AND PROCESS FOR CARRYING OUT ENDOTHERMIC OR EXOTHERMIC CATALYTIC REACTION

(75) Inventors: Søren Gyde Thomsen, Lyngby (DK); Michael Boe, Klampenborg (DK); Niels Erikstrup, Frederiksberg (DK); Olav Holm-Christensen, Fredensborg (DK)

(73) Assignee: Haldor Topsøe A/S, Lyngby (DK)

( * ) Notice: Subject to any disclaimer, the term of this patent is extended or adjusted under 35 U.S.C. 154(b) by 602 days.

(21) Appl. No.: 11/666,279

(22) PCT Filed: Oct. 14, 2005

(86) PCT No.: PCT/EP2005/011076
§ 371 (c)(1), (2), (4) Date: May 17, 2007

(87) PCT Pub. No.: WO2006/045457
PCT Pub. Date: May 4, 2006

(65) Prior Publication Data
US 2007/0255082 A1    Nov. 1, 2007

(30) Foreign Application Priority Data
Oct. 26, 2004   (DK) ............................... 2004 01635

(51) Int. Cl.
*B01J 19/00* (2006.01)
*B01J 8/18* (2006.01)
*F27B 15/00* (2006.01)
*F27B 15/08* (2006.01)
*F27B 15/14* (2006.01)
*F27B 15/16* (2006.01)

(52) U.S. Cl. .................. 422/198; 208/62; 422/138; 422/139; 422/141; 422/146; 422/147; 422/200; 422/201; 422/202; 422/239

(58) Field of Classification Search ................. 422/198, 422/148, 138, 139, 141, 146, 147, 200–202, 422/239; 585/702; 208/703, 706, 51, 62; 518/706, 703
See application file for complete search history.

(56) References Cited

U.S. PATENT DOCUMENTS
4,321,234 A    3/1982   Ohsaki et al.

(Continued)

FOREIGN PATENT DOCUMENTS
DE    24 05 606 A1   8/1975

(Continued)

OTHER PUBLICATIONS

Dusterwald et al, Methanol Steam-Reforming in a Catalytic Fixed Bed Reactor, Wiley-VCH Verlag GmbH, D-69469 Weinheim, 1997.*

*Primary Examiner*—Walter D Griffin
*Assistant Examiner*—Natasha Young
(74) *Attorney, Agent, or Firm*—Dickstein Shapiro LLP

(57) ABSTRACT

A heat exchange reactor for carrying out endothermic or exothermic reactions comprising: a housing defining an external reactor wall (1), a plurality of heat transfer tubes (2) arranged within said housing for the supply or removal of heat in catalyst beds (3, 3') disposed at least outside (3) said heat transfer tubes (2), and built-in elements (4) disposed in the outer periphery of said catalyst bed (3).

4 Claims, 2 Drawing Sheets

U.S. PATENT DOCUMENTS

| | | | |
|---|---|---|---|
| 4,741,885 A * | 5/1988 | Herbort et al. | 422/197 |
| 5,190,731 A | 3/1993 | Stahl | |
| 5,362,453 A * | 11/1994 | Marsch | 422/197 |
| 5,869,011 A | 2/1999 | Lee et al. | |
| 2005/0265908 A1 * | 12/2005 | Boe et al. | 422/198 |
| 2007/0000175 A1 * | 1/2007 | Boe et al. | 48/197 R |

FOREIGN PATENT DOCUMENTS

| | | |
|---|---|---|
| EP | 1 277 698 A | 1/2003 |
| WO | WO 2004/065341 A1 * | 8/2004 |

* cited by examiner

REACTOR AND PROCESS FOR CARRYING OUT ENDOTHERMIC OR EXOTHERMIC CATALYTIC REACTION

FIELD OF THE INVENTION

This invention relates to an improved heat exchange reactor and process for carrying out endothermic or exothermic catalytic reactions. In particular the invention relates to an improved heat exchange reactor and process for use in the steam reforming of hydrocarbon feed stocks for the production of synthesis gas comprising hydrogen and carbon monoxide.

BACKGROUND OF THE INVENTION

Catalytic reactors for carrying out endothermic or exothermic reactions are well known in the art particular examples being reactors for the endothermic steam reforming of hydrocarbons and reactors for the exothermic methanol synthesis reaction. The reactions are typically carried out in tubes loaded with a suitable solid catalyst through which a process gas stream comprising the reactants is passed at elevated pressure. A plurality of tubes is arranged vertically or horizontally in the reactor. The tubes run in parallel along the major axis of the catalytic reactor, while a heat-exchanging medium outside heats or cools the tubes. The solid catalyst inside the tubes provides a catalyst bed in which the required chemical reactions take place. The catalyst can be provided as solid particles or as a coated structure, for example as a thin layer fixed on the inner wall of the tubes in steam reforming reactors.

In another reactor configuration comprising a plurality of tubes the solid catalyst particles may be disposed outside said tubes hereinafter referred to also as heat transfer tubes, whilst the heat exchanging medium passes inside. The solid catalyst outside the heat transfer tubes provides the catalyst bed in which the required chemical reactions take place.

A particular type of heat transfer tube used in heat exchange reactors is the so-called double-tube. A double-tube is basically an arrangement of two substantially concentric tubes. The space in between the tube walls defines an annular cavity through which a heat-exchanging medium can flow so that temperature control is achieved by indirect heat exchanging between a process stream passing through the catalyst bed and said heat-exchanging medium. In an arrangement comprising a plurality of double-tubes, the solid catalyst in the bed is advantageously disposed both outside and inside the double-tubes.

Yet another type of heat transfer tubes in heat exchange reactors is an arrangement of two substantially concentric tubes, but where the inner tube is closed at one or both ends or simply is a solid elongated member such as a metallic bar or rod. The space in between the tube walls define s an annular cavity for the passage of the heat-exchanging medium. In an arrangement comprising a plurality of this type of heat transfer tubes, the solid catalyst bed is disposed only outside said tubes.

In this patent specification the terms "catalytic reactor" "heat exchange reactor" and "reactor" are used interchangeably. By "catalyst bed" is meant the volume of solid catalyst forming said bed and which is outside the heat transfer tubes and optionally, in the case of double-tubes, also inside said tubes. The terms "heat transfer tubes" and "tubes" are used interchangeably in this specification and cover any tube which is in contact with catalyst as well as a heat exchanging medium for the purpose of carrying out catalytic reactions.

A process and reactor in which a catalyst is in indirect contact with a heat exchanging medium is known from EP-A-0 271 299. This citation discloses a reactor and process that combines steam reforming and autothermal reforming. The steam reforming zone arranged in the lower region of the reactor comprise a number of tubes with catalyst disposed inside while on the upper region of the reactor an autothermal reforming catalyst is disposed outside the steam reforming tubes. EP-A-1 106 570 discloses a process for steam reforming in parallel connected tubular reformers (reactors) comprising a number of steam reforming tubes and being heated by indirect heat exchange. The catalyst is disposed in one reactor outside the steam reforming tubes and inside the steam reforming tubes in the other reactor.

In reactor configurations comprising solid catalyst particles disposed as a bed outside a plurality of heat transfer tubes, e.g. steam reforming tubes, the layout of such heat transfer tubes is of critical importance, since it would be desirable to achieve a uniform temperature distribution across the radial direction of the reactor. In other words, it would be desirable that at any given cross section along the height of the reactor, the temperature of the catalyst bed in the radial direction is kept as constant as possible.

At a given reactor length or height it is not difficult to obtain nearly uniform ratios of catalyst area (area of reactor cross section occupied by catalyst) to heat transfer area (outer surface of heat transfer tubes) and thereby uniform temperature distribution in the interior of the catalyst bed cross section, i.e. toward the centre of the reactor. This ratio can be kept constant if, for instance, the tube pitch is kept constant for the same heat transfer tube diameter. By tube pitch is meant the centre to centre distance of neighboring tubes. Even a change from for instance triangular pitch in the centre of the bed to a rectangular pitch near the periphery of the bed can be obtained without experiencing too large variations in the ratio of catalyst area to heat transfer area. However, at the periphery of the heated or cooled catalyst bed, the surrounding external reactor wall defining the periphery of the reactor does not heat nor cool the catalyst bed. In the outer periphery of said catalyst bed, that is in the regions near the external reactor wall, it can be impossible to obtain a ratio of catalyst area to heat transfer area similar to the ratio encountered toward the centre of the reactor. This is especially the case when a certain minimum distance is required between the outermost heat transfer tubes and the external reactor wall so that catalyst particles are able to surround the entire outer surface of said heat transfer tubes. If the external reactor wall is very close to or in direct contact with the outer wall of the outermost heat transfer tubes, solid catalyst particles may not be able to fit in between the wall and said tubes. Consequently dead corners or catalyst-free regions may be created. The empty space formed by these catalyst-free regions results in undesired gas channeling with concomitant undesired effects in terms of uneven flow, uneven temperature distribution in the catalyst bed as well as unconverted or less reacted process gas.

SUMMARY OF THE INVENTION

We have now developed a reactor which by simple means surprisingly overcomes the above problems. According to the invention, we provide a heat exchange reactor for carrying out endothermic or exothermic reactions comprising: a housing defining an external reactor wall, a plurality of heat transfer tubes arranged within said housing for the supply or removal of heat in catalyst beds disposed at least outside said heat transfer tubes and built-in elements disposed in the outer periphery of said catalyst bed.

Thus, the invention relates to the provision of built-in elements in the outer periphery of catalyst beds in heat exchange reactors where solid catalyst particles are disposed outside the heat transfer tubes. By "outer periphery of catalyst beds" is meant the region confined between the outer wall of the outermost heat transfer tube and the external reactor wall. By the term "catalyst being disposed at least outside said heat transfer tubes" is meant that the catalyst in the reactor is disposed outside the tubes, but it may also be disposed both as catalyst outside and inside said tubes when these are double-tubes. Accordingly, a reactor in which the catalyst only is disposed inside the tubes is outside the scope of the invention. By "built-in elements" is meant elements that are placed near or in direct contact with the external reactor wall and which serve to create a ratio of catalyst area to heat transfer area in the outer periphery of the catalyst bed similar to what is achieved in the remaining bed cross section. The provision of the built-in elements, which are elongated members running in parallel with respect to the heat transfer tubes of the reactor layout, reduce the amount of catalyst at the regions near the external reactor wall. Therefore, the built-in elements effectively lower the catalyst area and at the same time may add heat transfer area for heat removal or cooling. Suitable built-in elements can be elongated members of suitable thickness and shape, such as rods, e.g. metallic rods, which exert a minor effect in terms of heat exchange, but still serve to create a ratio of catalyst area to heat transfer area in the outer periphery of the catalyst bed similar to what is achieved in the remaining bed cross section. Preferably, the built-in elements are heat transfer tubes, since they additionally allow a heat exchanging medium to pass through. These tubes are hereinafter also referred to as "peripheral heat transfer tubes".

Accordingly, by means of the invention a more uniform temperature distribution across the whole bed of the reactor and in particular near the external reactor wall is achieved. Because the temperature toward the external reactor wall can be kept at about the same level as in the centre of the reactor, more even process conditions are achieved and a higher process gas conversion may be obtained, for instance in the highly endothermic steam reforming reaction.

In a preferred embodiment the peripheral heat transfer tubes have a cross section area that is smaller than the normal heat transfer tubes in the remaining part of the catalyst bed. The cross section of the peripheral heat transfer tubes is shaped in order to fit properly in the area between the outermost heat transfer tubes in the heating tube layout, i.e. the arrangement of heating transfer tubes within reactor, and the external reactor wall. By the term "to fit properly" is meant that catalyst particles are able to fill the space between the outermost heat transfer tubes and the peripheral heat transfer tubes so that gas channeling is minimized.

The peripheral heat transfer tubes are preferably positioned in direct contact with the external reactor wall. The peripheral heat transfer tubes may be simple tubes having a single wall and may be shaped so that they have a substantially semi-circular or triangular cross-section. Other types of tube can be envisaged, for example double-tubes.

Similarly, if the built-in elements are rods, e.g. metallic rods, their cross section is shaped in order to fit properly in the area between the outermost heat transfer tubes in the heating tube layout, i.e. the arrangement of heating transfer tubes within reactor and the external reactor wall. Said rods can also be shaped so that they have a substantially semi-circular or triangular cross-section. Other shapes would become apparent for those skilled in the art.

In one embodiment of the invention the solid catalyst particles forming the catalyst bed are provided outside the heat transfer tubes arranged within the housing of the heat exchanging reactor, but not inside said heat transfer tubes. That is, the catalyst is disposed only outside the heat transfer tubes. In another embodiment, the heat transfer tubes arranged within the housing off the heat exchanging reactor are double-tubes; the solid catalyst particles forming the catalyst bed are then disposed both outside and inside said double-tubes.

The region outside the peripheral heat transfer tubes is filled with solid catalyst particles that form part of the catalyst bed outside the heat transfer tubes. The heat exchanging medium passing through said peripheral heat transfer tubes is conveniently a fluid gas running co-currently or counter-currently to the process gas stream passing through said catalyst bed.

BRIEF DESCRIPTION OF THE DRAWINGS

The invention is illustrated by the accompanying figures.

DETAILED DESCRIPTION OF THE PREFERRED EMBODIMENTS

Figure 1:
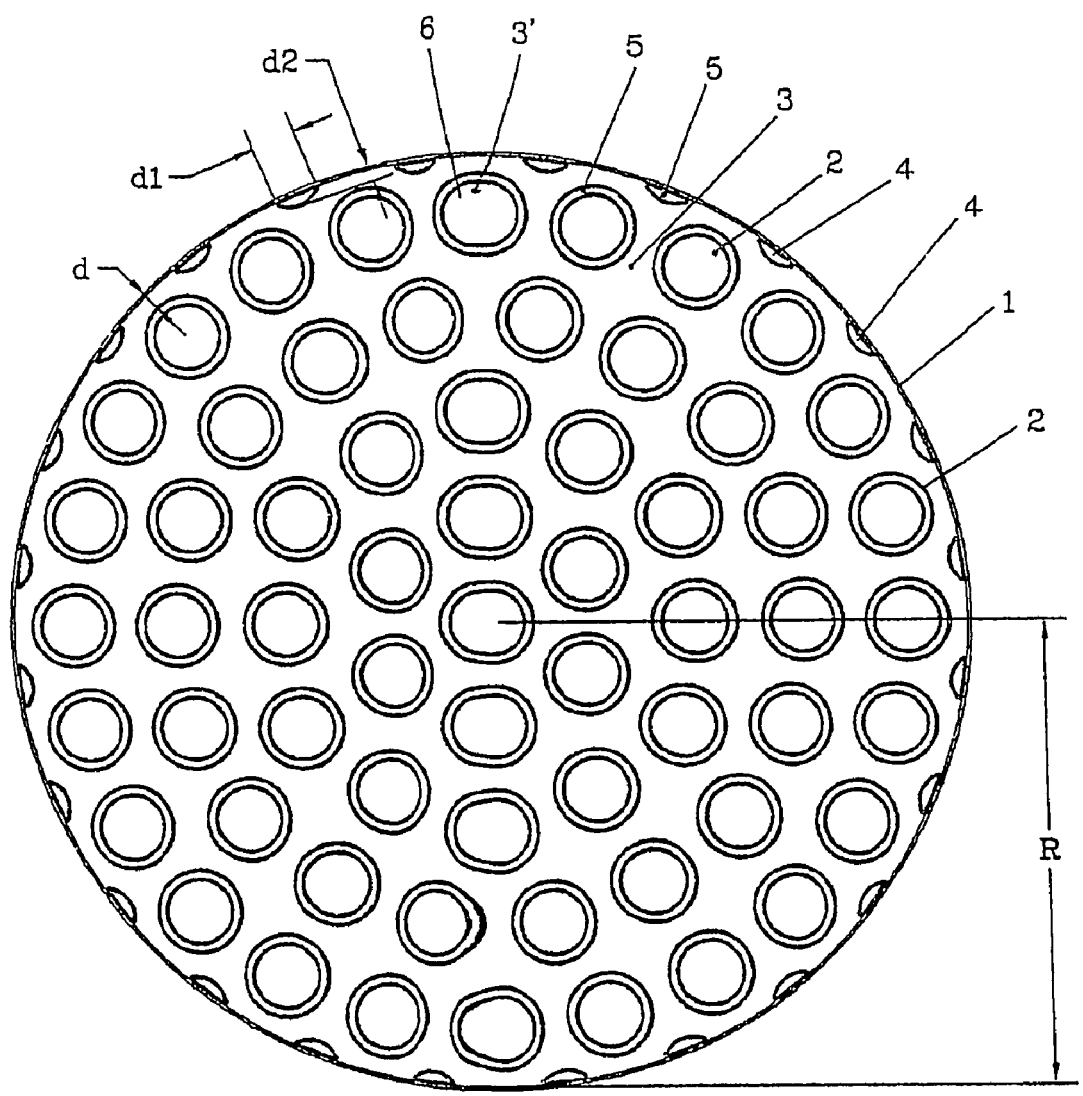
FIG. 1 shows a cross sectional view of a cylindrical heat exchange reactor of radius R contained within a housing or pressure shell (not shown).

In FIG. 1 the periphery of the reactor is defined by external wall 1, which is a metallic wall, for example stainless steel. The interior of the reactor comprises a plurality of heat transfer tubes 2, which in principle can have any shape, but are preferably cylindrical, i.e. with a circular cross section. The space in between heat transfer tubes 2 comprises catalyst particles forming catalyst bed 3. In this figure, where said heat transfer tubes 2 are double-tubes, their inner tubes are filled with solid catalyst particles 3'. The heat transfer tubes 2 are arranged so as to provide for a uniform distribution of heat and thereby uniform temperature throughout the whole cross-section of the reactor. A plurality of built-in elements, here peripheral heat transfer tubes 4 providing additional heat exchanging area and reducing the amount of catalyst near the external reactor wall 1 are placed near or in direct contact with said wall 1 and allow the passage of a heat exchanging medium 5 in counter-current with process gas 6. Process gas 6, for instance a gas mixture containing methane as the chief component, travels through the catalyst in a direction transverse to plane of the sheet of paper and is cooled or heated indirectly by heat exchanging medium 5 passing counter-currently with process gas 6 through the annular space created in between the walls of heat transfer tubes 2.

Peripheral heat transfer tubes 4 can have any shape but are preferably simple tubes with substantially semi-circular or substantially triangular so that their flatter region is able to fit with the curvature of the external reactor wall 1. Said peripheral heat transfer tubes 4 can be fitted to external reactor wall 1 by suitable anchoring means allowing for differential thermal expansion. The cross-section of peripheral heat transfer tubes 4 has a major axis $d_1$ and minor axis $d_2$, whereby said major axis $d_1$ defines the flatter region that is able to fit with the curvature of the external reactor wall 1. Preferably, the peripheral heat transfer tubes 4 are in direct contact with the external wall 1. A minimum radial distance d is provided between external reactor wall 1 and the outermost wall of the outermost heat transfer tubes 2, so that solid catalyst particles 3 are able to surround the entire outer surface of said heat transfer tubes 2.

Normally the length of peripheral heat transfer tubes 4 and heat transfer tubes 2 corresponds roughly to the length of the reactor, the length of the peripheral tubes being in the range 6 to 14 m. The thickness of the peripheral tubes is normally in the range 3-8 mm, while the heat transfer tubes, here represented by double-tubes, normally have an inner wall thickness of 2-6 mm and outer wall thickness of 3-8 mm. The annular spacing for the passage of heat exchanging medium 5 in the double tube is not more than about 4 to 12 mm.

Figure 2:
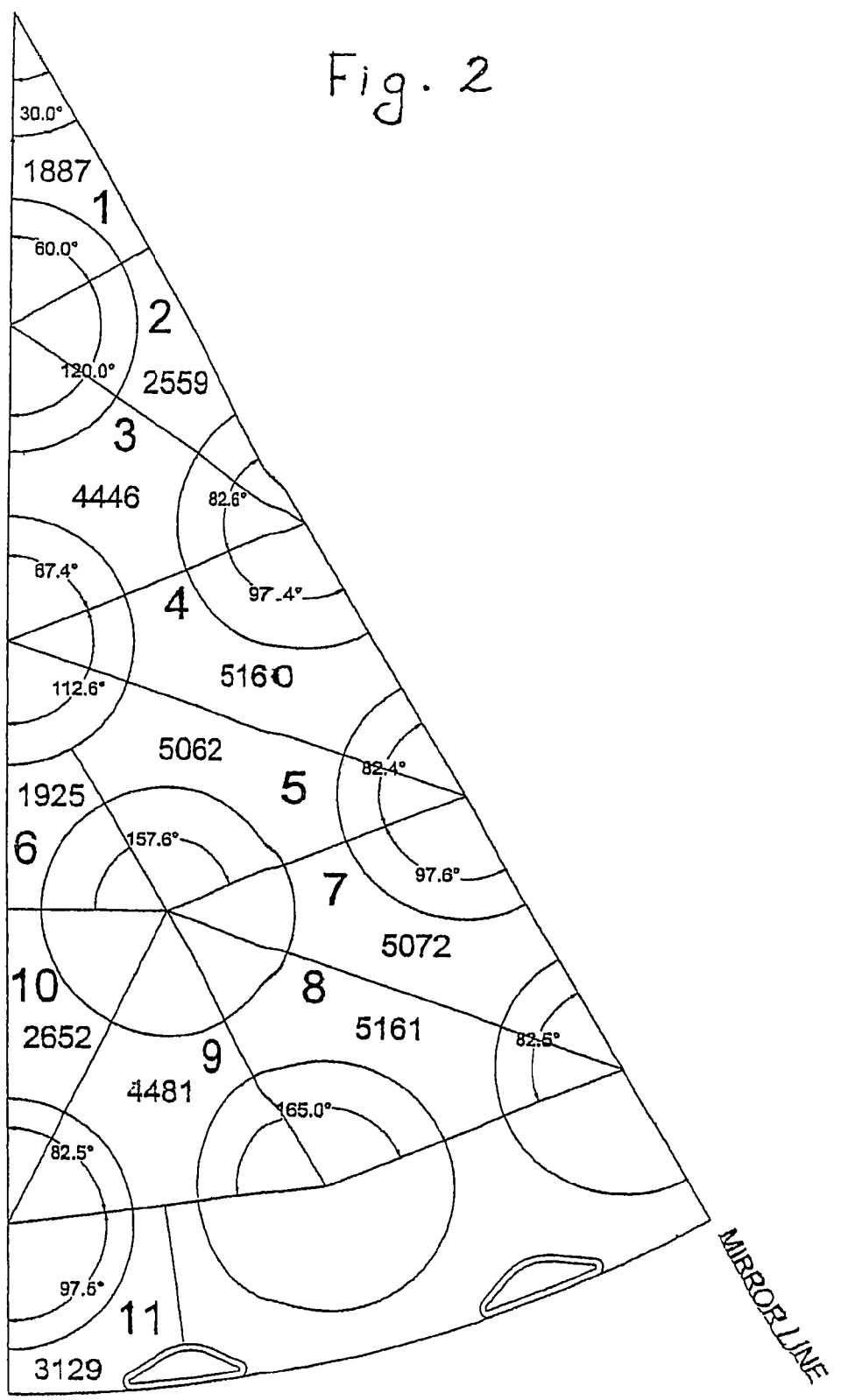
FIG. 2 is a cross sectional view of a 30° segment of the heat exchange reactor, where only the outer diameter of the outer tube of double-tubes are shown.

Referring now to FIG. 2, the layout of double-tubes shown is a 30° segment which can be mirrored to a 60° segment. This 60° section is repeated to form the full 360° tube layout. The area outside the tubes containing catalyst can be divided into sub-areas limited by lines drawn from double tube centre to double tube centre. All such areas containing catalyst receive heat from three outer tubes, each tube contributing with a heat transfer surface that corresponds to 60° of the tube perimeter, thus constituting a total heat transfer surface equal to half the circumference of an outer tube (180°). Eleven different sized locations between the double tubes exist which define the areas numbered 1-11. The locations denoted 1, 2, 6 and 10 are shown in half only and need to be mirrored (mirror line is the free side) to give the full shape and size of that particular location.

The heat transfer tubes are preferably arranged in a triangular pitch, where the minimum distance from double tube center to double tube center is about 143 mm. This results in a distance of about 29 mm between outer tubes of neighboring double tubes, which gives ample space for catalyst particles to fill the gap.

The catalyst areas of the various locations were calculated. Location 1 with the smallest area of 3774 mm² (2×1887 mm²) is best supplied with heat, while location 10 having the largest area of 5304 mm² (2×2652 mm²) has the poorest heat supply. For the two locations above the ratios of catalyst area to heat surface, defined by the catalyst area divided by outer perimeter of outer tubes, become 21.0 mm²/mm and 29.5 mm²/mm, respectively. During reactor operation, however, there will be some mixing of gas and horizontal heat transfer across the borders of the numbered areas, which will tend to lower the effect of the difference in catalyst area to heat surface ratio for the different locations.

The catalyst area outside the tubes was divided in five "catalyst rings" along the reactor's diameter and which were limited by lines drawn between centers of double tubes lying on the same or near same diameter. The results for the best tube layout are given in the table below:

TABLE

| | | Catalyst Ring Number | | | | |
|---|---|---|---|---|---|---|
| | | 1 | 2 | 3 | 4 | 5 |
| Numbered locations in catalyst ring | No. | 1 | 2, 3 | 4, 5, 6 | 7, 8, 9, 10 | 11 |
| Total catalyst area in catalyst ring | mm² | 22644 | 84060 | 145764 | 208392 | 150192 |
| Total catalyst area in catalyst ring | % | 3.7 | 13.8 | 23.9 | 34.1 | 24.6 |
| Total heat surface perimeter in ring | mm | 1077 | 3232 | 5386 | 7541 | 6616* |
| Catalyst area/heat surface | mm | 21.0 | 26.0 | 27.1 | 27.6 | 22.7* |

In the fifth ring, the values marked with * include heat transfer surface from peripheral heat transfer tubes having a triangular cross-section. Only the area in contact with the catalyst has been counted.

The variation in catalyst area to heat surface is found satisfactory low. The inner ring (No. 1) is over supplied with heat but only constitutes 3.7% of the total catalyst area. In order to compensate for the heat loss from the external reactor wall the heat transfer surface in the outer ring (No. 5) is greater than the average heat transfer surface. Without the peripheral heat transfer tubes, the total catalyst area in the catalyst ring becomes 171178 mm², while the total heat surface perimeter in the ring is 4668 mm. A high value of the ratio of catalyst area to heat surface is obtained: 36.7 mm.

CFD calculations confirmed that the temperature variations out of the catalyst bed or the outside the tubes are within ×30° C.

The invention is particularly useful for the steam reforming of hydrocarbon feedstocks comprising methane by means of heat supplied from hot effluent gas from an autothermal reforming reactor placed downstream the heat exchanging reactor and steam reformed product gas from the process. The hot effluent gas from the autothermal reforming reactor having a temperature of about 1050° C. is combined with the converted process gas in the heat exchanging reactor of the invention, which leaves the catalyst beds at the bottom of the reactor at about 880° C. The combined gas is used for the indirect heating of the catalyst beds disposed outside the heat transfer tubes of the reactor layout by letting pass said combined gas upwardly through the heat transfer tubes as well as through the peripheral heat transfer tubes, which are positioned near or at the external reactor wall and in parallel with the heat transfer tubes. The combined gas is cooled from about 1000° C. to about 650° C. at which temperature it leaves the reactor and is removed as a hydrogen-rich synthesis gas stream for further processing.

Accordingly, the invention also encompasses a process for the steam reforming of hydrocarbon feedstocks comprising: (a) forming a combined gas 5 in a heat exchange reactor by combining hot effluent gas from an autothermal reformer with converted process gas 6 leaving catalyst beds 3, 3' disposed at least outside the heat transfer tubes 2 of the reactor layout, (b) passing said combined gas 5 through the annular space of said heat transfer tubes, which are preferably double-tubes, for indirect heating of said catalyst beds 3, 3', (c) removing said combined gas 5 from the heat exchange reactor as a hydrogen-rich synthesis gas stream, wherein the heat exchanging reactor comprises peripheral heat transfer tubes 4 positioned near or at the external reactor wall 1 so that the combined gas 5 of step (a) is passed through said peripheral heat transfer tubes 4 positioned in parallel with heat transfer tubes 2.

The invention claimed is:

1. A heat exchange reactor for carrying out endothermic or exothermic reactions comprising:
   a housing defining an external reactor wall (1),
   a plurality of heat transfer tubes (2) arranged within said housing for the supply or removal of heat in catalyst beds (3, 3') disposed at least outside said heat transfer tubes (2) and built-in elements (4) which are elongated members running in parallel with respect to the heat transfer tubes and are disposed in the outer periphery of said catalyst bed (3), wherein said built-in elements are peripheral heat transfer tubes in which a heat exchanging medium passes through and said heat exchanging medium is a fluid gas running co-currently or counter-currently to the process gas stream passing through said catalyst bed, wherein the built-in elements (4) are positioned in direct contact with the external reactor wall (1).

2. A heat exchange reactor for carrying out endothermic or exothermic reactions comprising:
   a housing defining an external reactor wall (1),
   a plurality of heat transfer tubes (2) arranged within said housing for the supply or removal of heat in catalyst beds (3, 3') disposed at least outside said heat transfer tubes (2) and built-in elements (4) which are elongated members running in parallel with respect to the heat transfer tubes and are disposed in the outer periphery of said catalyst bed (3), wherein said built-in elements are peripheral heat transfer tubes in which a heat exchanging medium passes through and said heat exchanging medium is a fluid gas running co-currently or counter-currently to the process gas stream passing through said catalyst bed, wherein the built-in elements (4) have a substantially triangular or semi-circular cross-section.

3. A process for the steam reforming of hydrocarbon feedstocks comprising:
   (a) forming a combined gas (5) in a heat exchange reactor comprising:
      a housing defining an external reactor wall (1), and
      a plurality of heat transfer tubes (2) arranged within said housing for the supply or removal of heat in catalyst beds (3, 3') disposed at least outside (3) said heat transfer tubes (2) and built-in elements (4) which are elongated members running in parallel with respect to the heat transfer tubes and are disposed in the outer periphery of said catalyst bed (3), wherein said built-in elements are peripheral heat transfer tubes in which a heat exchanging medium passes through and said heat exchanging medium is a fluid gas running co-currently or counter-currently to the process gas stream passing through said catalyst bed;
      by combining hot effluent gas from an autothermal reformer with converted process gas (6) leaving catalyst beds (3, 3') disposed at least outside the heat transfer tubes (2) of said reactor,
   (b) passing said combined gas (5) through the annular space of said heat transfer tubes for indirect heating of said catalyst beds (3, 3'), and
   (c) removing said combined gas (5) from the heat exchange reactor as a hydrogen-rich synthesis gas stream, wherein the peripheral heat transfer tubes (4) are positioned near or at the external reactor wall (1) and the combined gas (5) of step (a) is passed through said peripheral heat transfer tubes (4) positioned in parallel with the heat transfer tubes (2).

4. A process according to claim 3, wherein heat transfer tubes (2) are double tubes and the combined gas (5) is passed through the annular space of said double-tubes.

* * * * *